United States Patent
Bae et al.

(10) Patent No.: US 11,858,567 B2
(45) Date of Patent: Jan. 2, 2024

(54) MOVABLE OBJECT

(71) Applicants: Hyundai Motor Company, Seoul (KR); Kia Corporation, Seoul (KR)

(72) Inventors: Ki Hyeon Bae, Gyeonggi-do (KR); Hyun Seop Lim, Gyeonggi-do (KR); Sang In Park, Gyeonggi-do (KR); Ju Young Yoon, Gyeonggi-do (KR); Dong Hyun Lee, Gyeonggi-do (KR); Beom Su Kim, Gyeonggi-do (KR); Joo Won Lee, Gyeonggi-do (KR); Hyo Joong Kim, Gyeonggi-do (KR); Dong Jin Hyun, Gyeonggi-do (KR); Kyu Jung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 185 days.

(21) Appl. No.: 17/505,003

(22) Filed: Oct. 19, 2021

(65) Prior Publication Data
US 2022/0242506 A1    Aug. 4, 2022

(30) Foreign Application Priority Data
Feb. 3, 2021   (KR) .................. 10-2021-0015687

(51) Int. Cl.
B62D 57/028    (2006.01)
(52) U.S. Cl.
CPC ................. B62D 57/028 (2013.01)
(58) Field of Classification Search
CPC .................................................. B62D 57/028
See application file for complete search history.

(56) References Cited

U.S. PATENT DOCUMENTS

| | | | |
|---|---|---|---|
| 7,719,222 B2 | 5/2010 | Theobald | |
| 11,603,149 B2 * | 3/2023 | Suh | B62D 57/028 |
| 2009/0039819 A1 | 2/2009 | Wilson et al. | |
| 2019/0015273 A1 | 1/2019 | Linon | |
| 2019/0255701 A1 | 8/2019 | Blankespoor et al. | |

FOREIGN PATENT DOCUMENTS

| | | | |
|---|---|---|---|
| CN | 110076801 A | * | 8/2019 |
| CN | 209535274 U | * | 10/2019 |
| CN | 111846002 A | * | 10/2020 |
| CN | 112172957 A | * | 1/2021 |
| CN | 112373594 A | * | 2/2021 |
| CN | 112590966 A | * | 4/2021 |
| CN | 112706851 A | * | 4/2021 |
| CN | 112706852 A | * | 4/2021 |
| CN | 110696940 B | * | 8/2021 |
| CN | 115285250 A | * | 11/2022 |
| KR | 100873723 B1 | * | 12/2008 |
| KR | 101153125 B1 | | 6/2012 |
| WO | 2017-201184 A1 | | 11/2017 |

* cited by examiner

*Primary Examiner* — Kevin Hurley
(74) *Attorney, Agent, or Firm* — Fox Rothschild LLP

(57) ABSTRACT

A movable object includes an upper frame and a drive part that is provided under the upper frame and is connected to the upper frame. The drive part includes a first actuator that is connected to the upper frame and rotates on a vertical axis, a first link that is connected to the first actuator and rotatable on the vertical axis by the first actuator, a second actuator that is provided on a first side of the first link and rotates on a horizontal axis, and a second link that faces the first link and is rotatable on a first end portion thereof facing the first link by the second actuator.

16 Claims, 9 Drawing Sheets

ND OBJECT

CROSS-REFERENCE TO RELATED APPLICATION

This application is based on and claims the benefit of priority to Korean Patent Application No. 10-2021-0015687, filed on Feb. 3, 2021, the disclosure of which is incorporated herein in its entirety by reference.

TECHNICAL FIELD

The present disclosure relates to a movable object, and more particularly, to a movable object which is capable of moving in various modes.

BACKGROUND

A quadruped walking robot with four legs may have a wheel and joint structure to move on a flat ground using wheels and walk on an uneven ground using the legs. The quadruped walking robot usually has a structure in which the wheels are provided at the ends of the legs. According to the related art, in order for the robot to move using the wheels, the wheels provided at the ends of the legs need to come into contact with the ground after all joint structures of the legs are extended. In such a wheel driving mode, however, the robot's leg moment arm increases, making it susceptible to vibration and load. In addition, according to the related art, in order for the robot to travel on the wheels, the wheels provided at the ends of the legs need to come into contact with the ground, so the robot may not perform other tasks while traveling.

SUMMARY

The present disclosure has been made to solve the above-mentioned problems occurring in the prior art while advantages achieved by the prior art are maintained intact. An aspect of the present disclosure provides a movable object having a novel structure, thereby improving durability with respect to vibration and load and performing other tasks while moving using wheels.

According to an aspect of the present disclosure, a movable object may include: an upper frame; and a drive part disposed under the upper frame and connected to the upper frame, wherein the drive part may include: a first actuator connected to the upper frame and rotating on a vertical axis; a first link connected to the first actuator and being rotatable on the vertical axis by the first actuator; a second actuator disposed on a first side of the first link and rotating on a horizontal axis; and a second link facing the first link and being rotatable on a first end portion thereof facing the first link by the second actuator.

The drive part may further include: a third actuator provide on a first side of the second link and rotating on the horizontal axis; and a third link facing the second link, and being rotatable on a first end portion thereof facing the second link by the third actuator. In addition, the drive part may include: a fourth actuator; and a first wheel rotatable by the fourth actuator. The first wheel may be disposed on a first end portion of the third link facing the second link.

The fourth actuator may be provided in the second link. In another embodiment, the fourth actuator may be provided in the third link. The drive part may further include a second wheel disposed on a second end portion of the third link. The drive part may further include a first pulley surrounding a rotating shaft of the fourth actuator and an outer circumference of the first wheel, and configured to transmit a rotational force of the fourth actuator to the first wheel.

The drive part may further include a second pulley surrounding the outer circumference of the first wheel and an outer circumference of the second wheel, and configured to transmit a rotational force of the first wheel to the second wheel. The drive part may include first to fourth drive parts, and the first to fourth drive parts may be provided on peripheral areas of a bottom surface of the upper frame.

The first link may be rotatable at 360 degrees by the first actuator. The third link may be rotatable on a first end portion thereof facing the second link at 360 degrees. A radius of curvature of the first pulley in an area where the first pulley surrounds the rotating shaft of the fourth actuator may be less than that of the first pulley in an area where the first pulley surrounds the outer circumference of the first wheel. A radius of curvature of the second pulley in an area where the second pulley surrounds the outer circumference of the first wheel may correspond to that of the second pulley in an area where the second pulley surrounds the outer circumference of the second wheel. The first to fourth drive parts may have substantially the same structure so that the first to fourth drive parts are compatible with each other.

The movable object may further include an extension part provided on a top surface of the upper frame, and being rotatable in a state of being fixed to the upper frame. The first pulley may face an outer surface of the second link. The second pulley may face an outer surface of the third link. The second pulley may be interposed between the third link and the first wheel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a movable object according to exemplary embodiments of the present disclosure will be described in detail with reference to the accompanying drawings.

Movable Object

Figure 1:
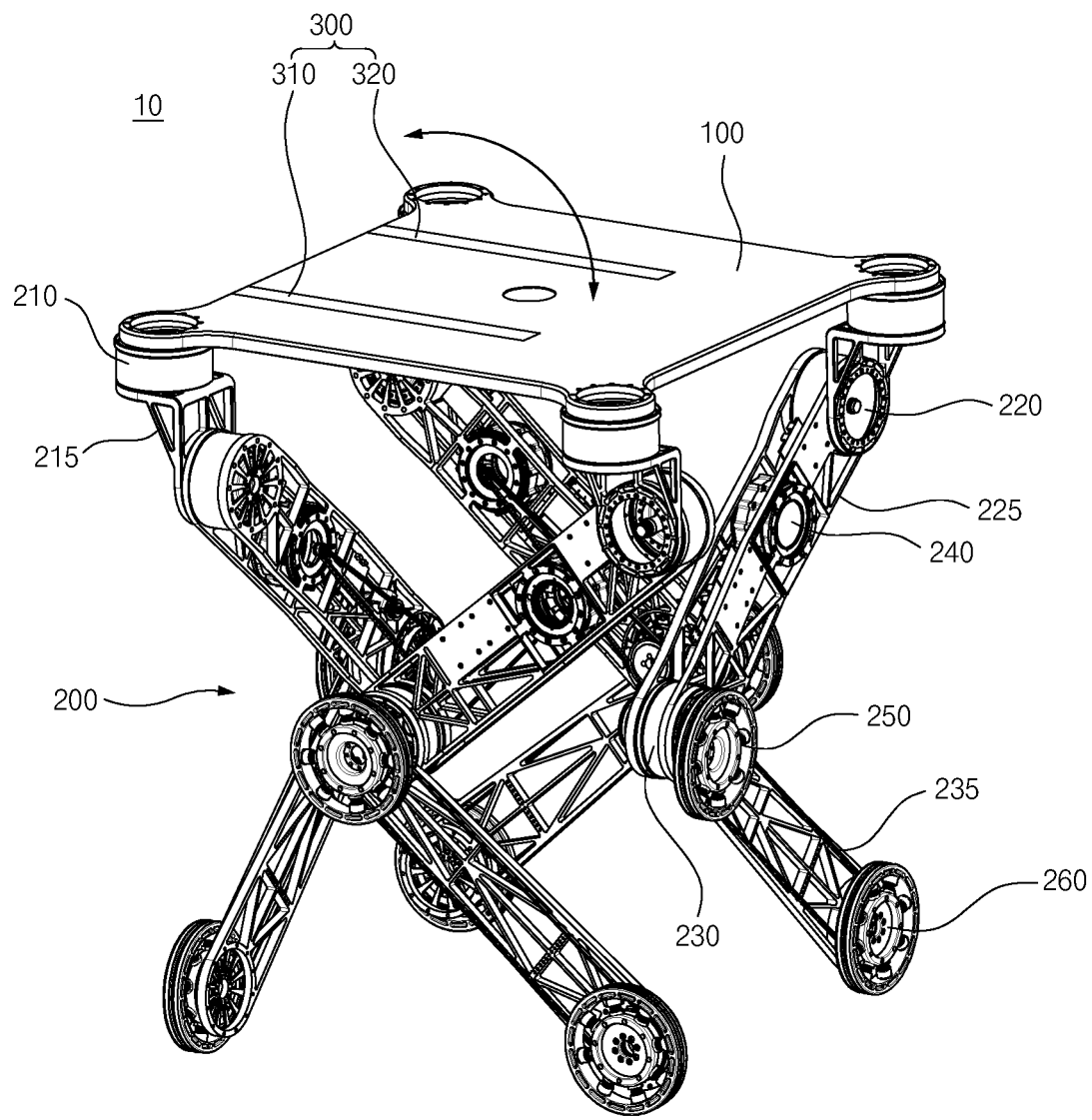
FIG. 1 illustrates a perspective view of a movable object according to an exemplary embodiment of the present disclosure.
Figure 2:
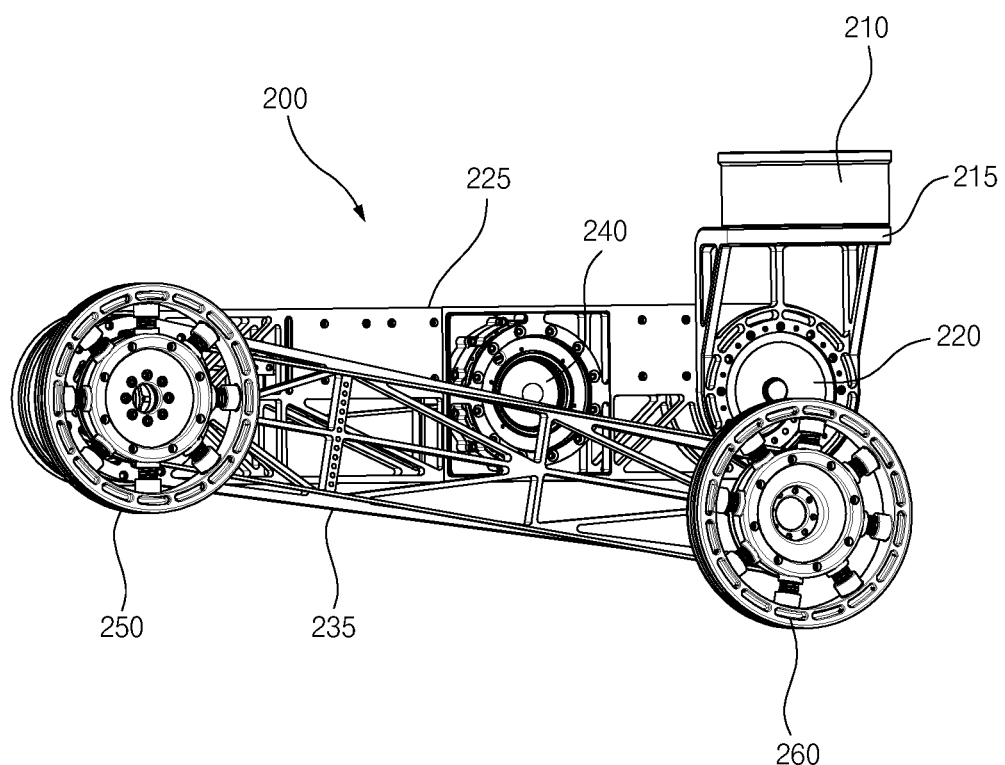
FIG. 2 illustrates a first enlarged perspective view of one of drive parts in a movable object according to an exemplary embodiment of the present disclosure.
Figure 3:
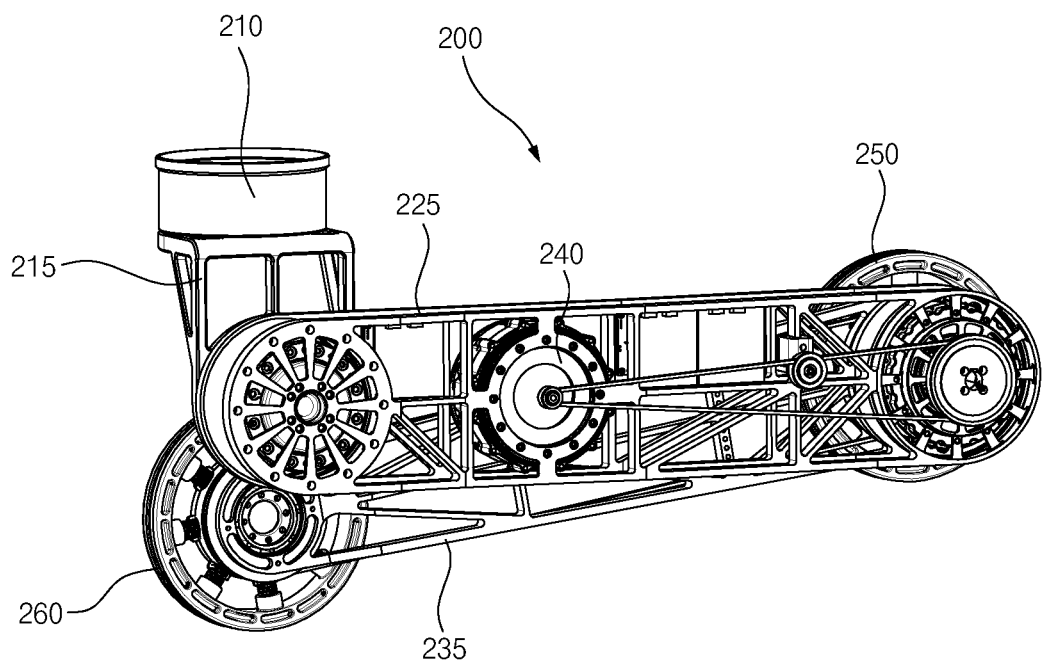
FIG. 3 illustrates a second enlarged perspective view of one of drive parts in a movable object according to an exemplary embodiment of the present disclosure.

FIG. 1 illustrates a perspective view of a movable object according to an exemplary embodiment of the present disclosure, and FIG. 2 illustrates a first enlarged perspective view of one of drive parts in a movable object according to an exemplary embodiment of the present disclosure. In addition, FIG. 3 illustrates a second enlarged perspective view of one of drive parts in a movable object according to an exemplary embodiment of the present disclosure.

As illustrated in FIG. 1, a movable object 10 according to an exemplary embodiment of the present disclosure may include an upper frame 100 disposed on an upper portion of the movable object, and a drive part 200 disposed under the upper frame 100 and connected to the upper frame 100. The upper frame 100 may be formed in various shapes. \For example, as illustrated in FIG. 1, the upper frame 100 may have a plate shape. The movable object 10 according to exemplary embodiments of the present disclosure may be used for various purposes. For example, the movable object 10 may be used to transport goods. In particular, the upper frame 100 may receive and support the goods to be transported.

The drive part 200 may be configured to allow the movable object 10 to move. In particular, the drive part 200 may have a plurality of drive parts. For example, four drive parts 200 may be provided on the movable object 10. As illustrated in FIG. 1, the drive part 200 may include first to fourth drive parts. Particularly, the first to fourth drive parts may be provided on peripheral areas of a bottom surface of the upper frame 100. For example, as illustrated in FIG. 1, when the bottom surface of the upper frame 100 has a rectangular shape, the first to fourth drive parts may be adjacent to corners of the bottom surface of the upper frame 100, respectively.

In addition, when the movable object 10 includes the plurality of drive parts 200, the drive parts 200 may have substantially the same structure so that they may be compatible with each other. For example, as illustrated in FIG. 1, when the four drive parts 200 are provided, the first to fourth drive parts may have substantially the same structure so that they may be compatible with each other. In particular, only one type of drive part may be required to manufacture the movable object 10, which thus improves the manufacturability of the movable object 10 according to exemplary embodiments of the present disclosure. Those skilled in the art to which the present disclosure pertains may determine whether the drive parts are compatible with each other. Hereinafter, the drive part in the movable object according to exemplary embodiments of the present disclosure will be described in detail.

As illustrated in FIGS. 1 to 3, the drive part 200 may include a first actuator 210 connected to the upper frame 100. For example, the first actuator 210 may be connected to the bottom surface of the upper frame 100. In addition, the first actuator 210 may rotate on a vertical axis. The various actuator described herein may be operated by an overall controller.

In addition, the drive part 200 may further include a first link 215 connected to the first actuator 210. The first link 215 may be rotatable by a rotational force received from the first actuator 210. More specifically, the first link 215 may be rotatable on the vertical axis by the first actuator 210. Accordingly, for example, as illustrated in FIG. 1, the first link 215 may be connected to a lower portion of the first actuator 210. According to an exemplary embodiment of the present disclosure, since the first actuator 210 allows the first link 215 to rotate on the vertical axis, the drive part 200 may be rotatable in parallel to the ground, and thus the movable object 10 may be able to create various postures.

Meanwhile, the drive part 200 of the movable object 10 according to an exemplary embodiment of the present disclosure may further include a second actuator 220 disposed on a first side of the first link 215 and rotating on a horizontal axis. For example, as illustrated in FIG. 1, the second actuator 220 may be connected to a lower portion of the first link 215.

In addition, the drive part 200 may further include a second link 225 facing the first link 215 and being rotatable on a first end portion thereof (of two end portions) facing the first link 215 by the second actuator 220. The rotation axis of the second link 225 driven by the second actuator 220 and the rotation axis of the first link 215 driven by the first actuator 210 may be perpendicular to each other. According to an exemplary embodiment of the present disclosure, the second link 225 may be rotatable by the second actuator 220 to move in a direction away from the upper frame 100 or in a direction toward the upper frame 100, thereby allowing the movable object 10 to take various postures. In FIG. 1, a first end portion of the second link 225 (of two end portions) in a longitudinal direction thereof may be connected to the second actuator 220. For example, as illustrated in FIG. 1, the second actuator 220 may be connected to a first side of the first link 215, and the second link 225 may face the first link 215 in an area where the first link 215 and the second actuator 220 are connected.

Meanwhile, the drive part 200 may further include a third actuator 230 disposed on a first side of the second link 225 and rotating on the horizontal axis. For example, as illustrated in FIG. 1, the third actuator 230 may be connected to a second end portion of the second link 225 in the longitudinal direction.

In addition, the drive part 200 may further include a third link 235 facing the second link 225, and being rotatable on a first end portion thereof (of two end portions) facing the second link 225 by the third actuator 230. The rotation axis of the third link 235 driven by the third actuator 230 and the rotation axis of the first link 215 driven by the first actuator 210 may be perpendicular to each other, and the rotation axis of the third link 235 driven by the third actuator 230 and the rotation axis of the second link 225 driven by the second actuator 220 may be parallel to each other. According to an exemplary embodiment of the present disclosure, the third link 235 may be rotatable by the third actuator 230 to move in the direction away from the upper frame 100 or in the direction toward the upper frame 100, thereby allowing the movable object 10 to take various postures.

In other words, according to exemplary embodiments of the present disclosure, by combining the rotational motions of the first link 215, the second link 225, and the third link 235, various postures of the movable object 10 may be achieved. For example, as illustrated in FIG. 1, the third actuator 230 may be provided on a first side (of two sides) of the second link 225, and the third link 235 may face the second link 225 in an area where the second link 225 and the third actuator 230 are connected.

Figure 4:
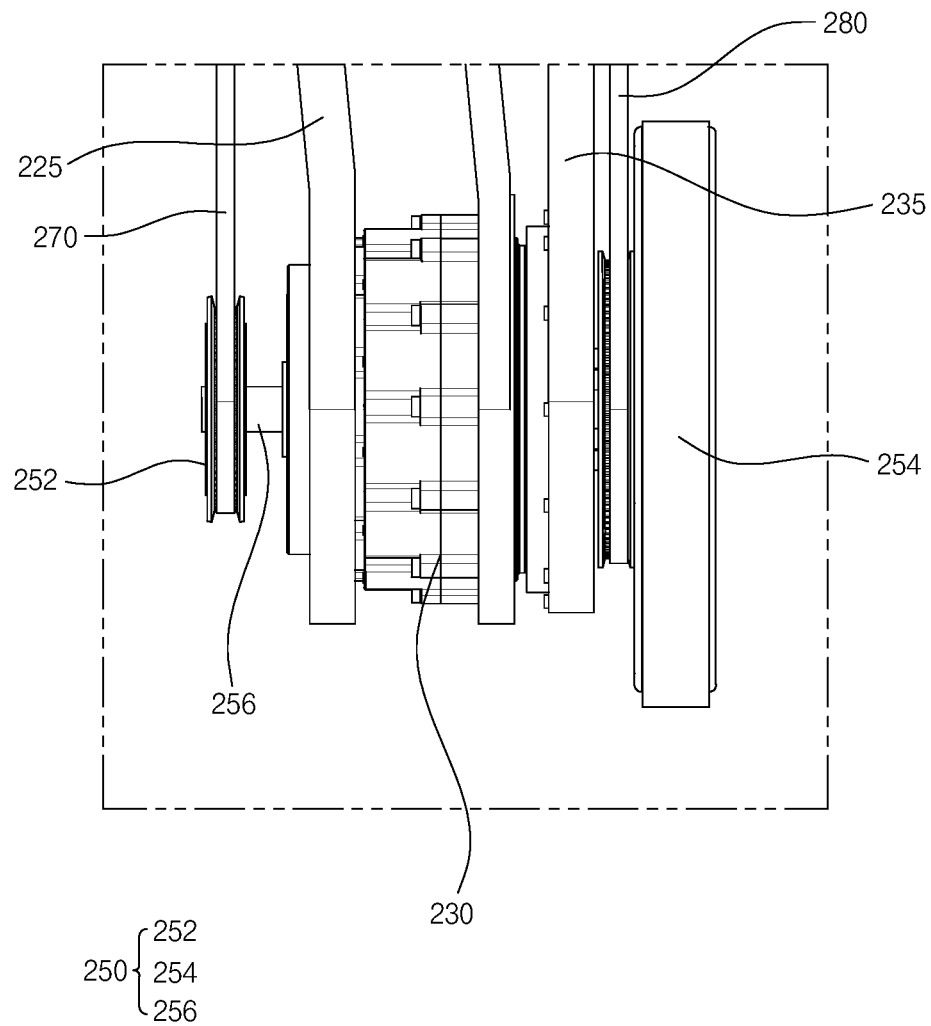
FIG. 4 illustrates an enlarged side view of a connection structure of a third actuator and related components provided in a drive part of a movable object according to an exemplary embodiment of the present disclosure.
Figure 5:
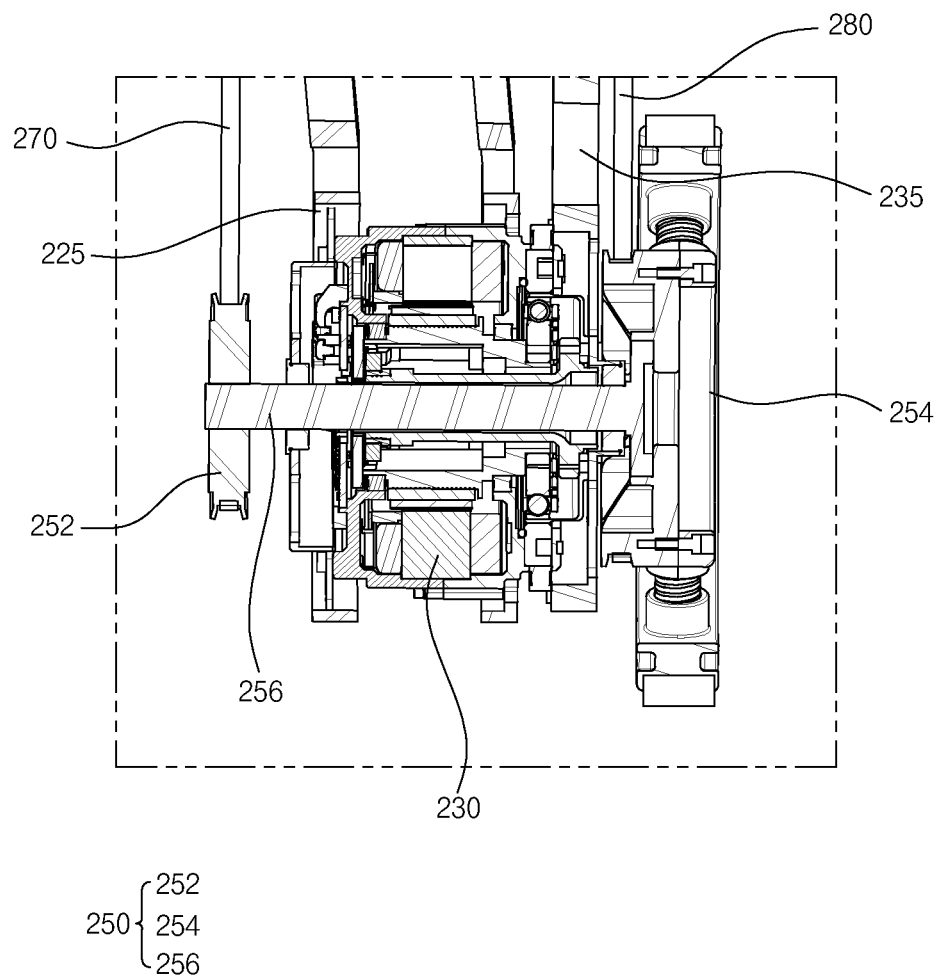
FIG. 5 illustrates an enlarged cross-sectional view of a connection structure of a third actuator and related components provided in a drive part of a movable object according to an exemplary embodiment of the present disclosure.

FIG. 4 illustrates an enlarged side view of a connection structure of a third actuator and related components provided in a drive part of a movable object according to an exemplary embodiment of the present disclosure, and FIG. 5 illustrates an enlarged cross-sectional view of a connection structure of a third actuator and related components provided in a drive part of a movable object according to an exemplary embodiment of the present disclosure.

As illustrated in FIGS. 1 to 5, the drive part 200 in the movable object 10 according to an exemplary embodiment of the present disclosure may further include a fourth actuator 240 and a first wheel 250 rotatable by the fourth actuator 240. In other words, the first wheel 250 may be configured to receive power from the fourth actuator 240 to perform rotational motion.

According to an exemplary embodiment of the present disclosure, the first wheel 250 may be provided on a first end portion (of two end portions) of the third link 235 facing the second link 225. Meanwhile, as illustrated in FIGS. 4 and 5, a first side of the third actuator 230 may be connected to the second link 225, and a second side of the third actuator 230 may be connected to the third link 235. The first wheel 250 may extend through the second link 225, the third actuator 230, and the third link 235. More specifically, the first wheel 250 may include a first rotating member 252 provided on the outside of the second link 225, a second rotating member 254 provided on the outside of the third link 235, and a rotating shaft 256 that connects the first rotating member 252 and the second rotating member 254 and extends through the third actuator 230.

As illustrated in FIGS. 1 to 3, according to an exemplary embodiment of the present disclosure, the fourth actuator 240 may be fixed into the second link 225. More specifically, the fourth actuator 240 may be spaced apart from the first wheel 250 in a direction toward the second actuator 220. An empty space in which the fourth actuator 240 is mounted may be formed in the second link 225.

According to another exemplary embodiment of the present disclosure, the fourth actuator 240 may be fixed into the third link 235. In particular, the fourth actuator 240 may be spaced apart from the first wheel 250 in a direction toward a second wheel 260 (see FIG. 1, etc.).

Referring to FIGS. 1 to 3, the drive part 200 may further include the second wheel 260 provided on the second end portion of the third link 235. More specifically, a first end portion of the third link 235 facing the second link 225 may be provided with the first wheel 250, and a second end portion of the third link 235 may be provided with the second wheel 260.

As described above, since the fourth actuator 240 and the first wheel 250 are spaced apart from each other, an additional power transmission device may be required to transmit a rotational force of the fourth actuator 240 to the first wheel 250. Thus, as illustrated in FIGS. 1 to 5, the drive part 200 may further include a first pulley 270 that surrounds a rotating shaft of the fourth actuator 240 and an outer circumference of the first wheel 250, and may be configured to transmit the rotational force of the fourth actuator 240 to the first wheel 250. More specifically, the first pulley 270 may surround an outer circumference of the first rotating member 252 of the first wheel 250. In FIGS. 4 and 5, the first pulley 270 may face an outer surface of the second link 225.

Meanwhile, the drive part 200 may further include a second pulley 280 that surrounds the outer circumference of the first wheel 250 and an outer circumference of the second wheel 260, and may be configured to transmit a rotational force of the first wheel 250 to the second wheel 260. More specifically, the second pulley 280 may surround an outer circumference of the second rotating member 254 of the first wheel 250. In FIGS. 4 and 5, the second pulley 280 may face an outer surface of the third link 235, and be interposed between the third link 235 and the first wheel 250.

In other words, according to an exemplary embodiment of the present disclosure, when the fourth actuator 240 is driven, the first wheel 250 and the second wheel 260 may rotate together. The rotational force generated by the driving of the fourth actuator 240 may be transmitted in the order of the first pulley 270, the first rotating member 252 of the first wheel, the rotating shaft 256 of the first wheel, the second rotating member 254 of the first wheel, the second pulley 280, and the second wheel 260. Meanwhile, to maximize the degree of freedom in the postures of the movable object 10 according to an exemplary embodiment of the present disclosure, the first link 215 may be rotatable at 360 degrees by the first actuator 210, and the third link 235 may be rotatable on a first end portion thereof facing the second link 225 at 360 degrees.

Meanwhile, according to an exemplary embodiment of the present disclosure, a radius of curvature of the first pulley 270 in an area where the first pulley 270 surrounds the rotating shaft of the fourth actuator 240 may be less than that of the first pulley 270 in an area where the first pulley 270 surrounds the outer circumference of the first wheel 250, that is, the first pulley 270 surrounds the outer circumference of the first rotating member 252. This reduces a rotational speed and increases a torque when the rotational force of the fourth actuator 240 is transmitted to the first wheel 250.

On the other hand, according to an exemplary embodiment of the present disclosure, a radius of curvature of the second pulley 280 in an area where the second pulley 280 surrounds the outer circumference of the first wheel 250, that is, the second pulley 280 surrounds the outer circumference of the second rotating member 254 may correspond to that of the second pulley 280 in an area where the second pulley 280 surrounds the outer circumference of the second wheel 260. In particular, that the two radii of curvature correspond to each other may be interpreted as follows: i) the two radii of curvature are the same; and ii) there is no significant difference between the two radii of curvature so that a rotational angular velocity of the first wheel 250 and a rotational angular velocity of the second wheel 260 may be substantially the same.

Meanwhile, referring to FIG. 1, the movable object 10 according to an exemplary embodiment of the present disclosure may further include an extension part 300 provided on a top surface of the upper frame 100, and being rotatable in a state of being fixed to the upper frame 100. The extension part 300 may include a first extension member 310 that extends in one direction, and a second extension member 320 that extends in parallel to the first extension member 310.

The extension part 300 may assist the movable object 10 in transporting goods. In other words, after the first extension member 310 and the second extension member 320 are inserted between the goods and the ground, the first extension member 310 and the second extension member 320 of the extension part 300 may be rotated in a direction indicated by a double-headed arrow in FIG. 1 in a state in which a first end portion of the extension part 300 is fixed to the upper frame 100, thereby moving the goods on the ground to the top surface of the upper frame 100. Thus, with the aid of the extension part 300, the movable object 10 according to an exemplary embodiment of the present disclosure may carry out the transportation of goods.

Meanwhile, the movable object 10 according to another exemplary embodiment of the present disclosure may not include the second wheel 260. In particular, when the movable object 10 needs to travel by moving using the wheels, the movable object 10 may travel in a state in which the first wheels 250 come into contact with the ground, and when the movable object 10 moves on an uneven ground, the second end portion of the third link 235 at which the first wheel 250 is not provided may come into contact with the ground so that the movable object 10 may mimic a human or animal's gait.

Meanwhile, to prevent the second link 225 from interfering with the other components of the movable object 10, especially, the upper frame 100 of the movable object 10, during the rotation of the second link 225 by the second actuator 220, the second link 225 may be spaced apart from the upper frame 100. In other words, the second link 225 may be spaced apart from the upper frame 100 in a vertical direction, and thus the second link 225 may rotate without interference with the upper frame 100.

Figure 6:
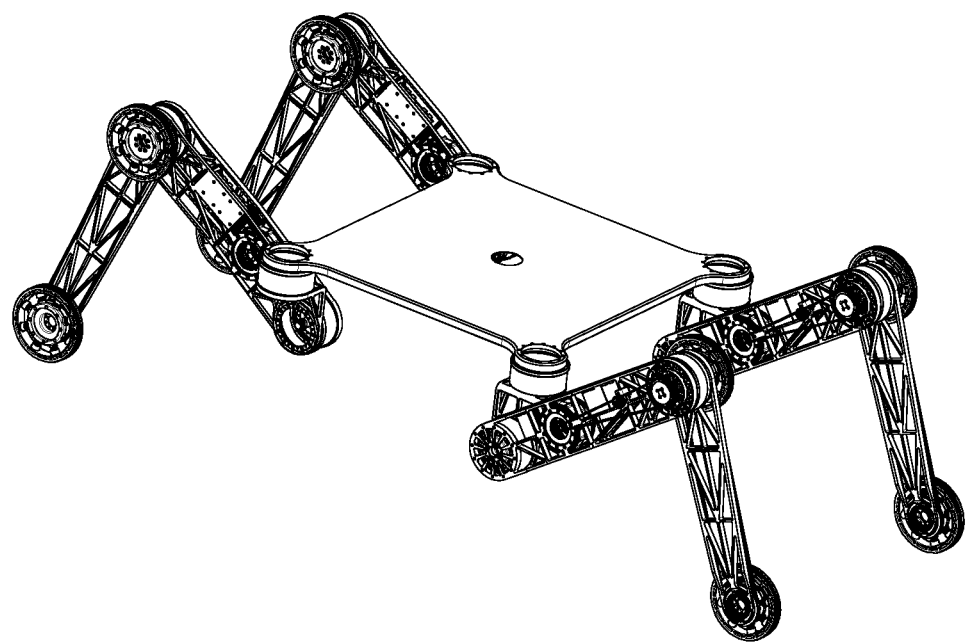
FIG. 6 illustrates a perspective view of a first exemplary posture that may be taken by a movable object according to an exemplary embodiment of the present disclosure.
Figure 7:
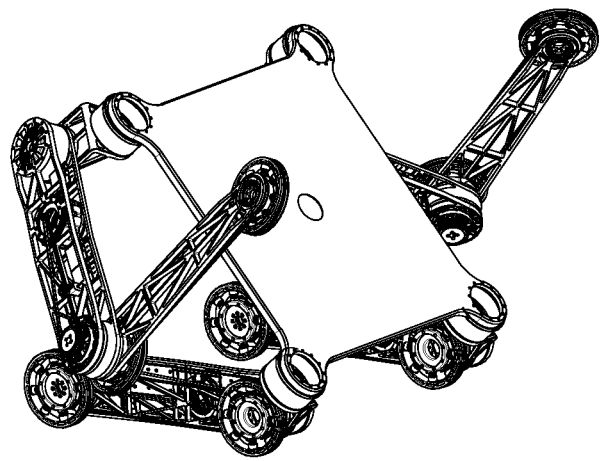
FIG. 7 illustrates a perspective view of a second exemplary posture that may be taken by a movable object according to an exemplary embodiment of the present disclosure.
Figure 8:
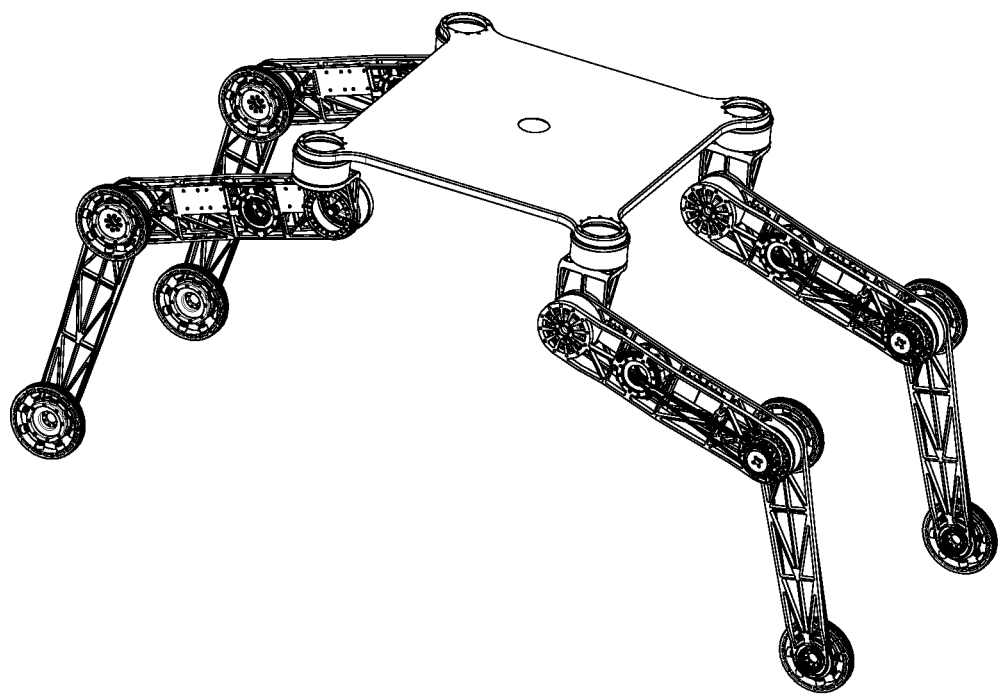
FIG. 8 illustrates a perspective view of a third exemplary posture that may be taken by a movable object according to an exemplary embodiment of the present disclosure.
Figure 9:
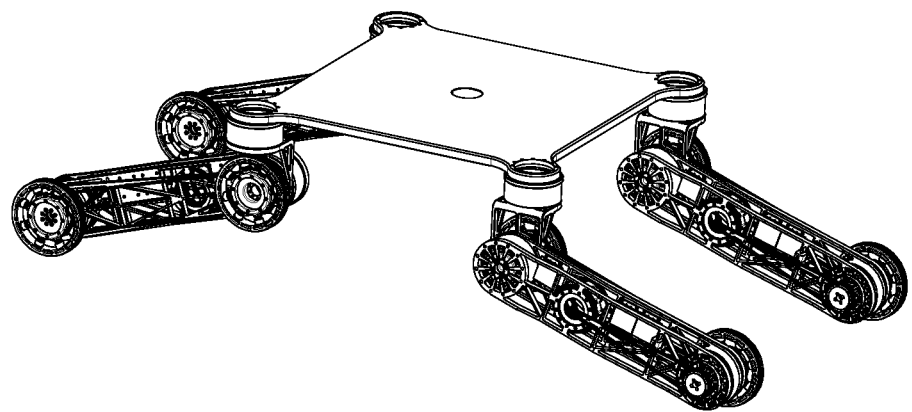
FIG. 9 illustrates a perspective view of a fourth exemplary posture that may be taken by a movable object according to an exemplary embodiment of the present disclosure.

FIG. 6 illustrates a perspective view of a first exemplary posture that may be taken by a movable object according to an exemplary embodiment of the present disclosure, and FIG. 7 illustrates a perspective view of a second exemplary posture that may be taken by a movable object according to an exemplary embodiment of the present disclosure. FIG. 8 illustrates a perspective view of a third exemplary posture that may be taken by a movable object according to an exemplary embodiment of the present disclosure, and FIG. 9 illustrates a perspective view of a fourth exemplary posture that may be taken by a movable object according to an exemplary embodiment of the present disclosure.

As illustrated in FIGS. 6 to 9, the movable object 10 according to an exemplary embodiment of the present disclosure may include the first to third actuators 210, 220, and 230 (see FIG. 1) causing the first to third links 215, 225, and 235 (see FIG. 1) to rotate independently in addition to the fourth actuator 240 (see FIG. 1) for driving the wheels 250 and 260 (see FIG. 1) and thus, the movable object 10 may move while maintaining various types of postures according to various situations. For example, when it is necessary to maintain the center of gravity of the movable body 10 low, the movable body 10 may take the posture illustrated in FIG. 6 or 9 by operating the first to third links 215, 225, and 235 using the first to third actuators 210, 220, and 230. As another example, when it is necessary to maintain the center of gravity of the movable body 10 high, the movable body 10 may take the posture illustrated in FIG. 8 by operating the first to third links 215, 225, and 235 using the first to third actuators 210, 220, and 230. As another example, the movable object 10 may also take a posture similar to a human's kneeling posture as illustrated in FIG. 7.

In addition, according to an exemplary embodiment of the present disclosure, the first to third links 215, 225, and 235 may be operated to move the movable object 10 in a state in which only the first wheels 250 come into contact with the ground. In some cases, the first to third links 215, 225, and 235 may be operated to move the movable object 10 in a state in which both the first wheels 250 and the second wheels 260 come into contact with the ground. In addition to the above-described features, the movable object 10 according to exemplary embodiments of the present disclosure may take many different types of postures.

As set forth above, the movable object according to exemplary embodiments of the present disclosure may have a novel structure, thereby improving durability with respect to vibration and load and performing other tasks while moving using the wheels.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A movable object, comprising:
an upper frame; and
a drive part disposed under the upper frame and connected to the upper frame,
wherein the drive part includes:
a first actuator connected to the upper frame and rotating on a vertical axis;
a first link connected to the first actuator and rotatable on the vertical axis by the first actuator;
a second actuator provided on a first side of the first link and rotating on a horizontal axis;
a second link facing the first link and being rotatable on a first end portion thereof facing the first link by the second actuator;
a third actuator provided on a first side of the second link and rotating on the horizontal axis;
a third link facing the second link, and rotatable on a first end portion thereof facing the second link by the third actuator;
a fourth actuator; and
a first wheel rotatable by the fourth actuator,
wherein the first wheel is provided on the first end portion of the third link facing the second link.

2. The movable object according to claim 1, wherein the fourth actuator is provided in the second link.

3. The movable object according to claim 1, wherein the fourth actuator is provided in the third link.

4. The movable object according to claim 1, wherein the drive part further includes a second wheel provided on a second end portion of the third link.

5. The movable object according to claim 4, wherein the drive part further includes a first pulley surrounding a rotating shaft of the fourth actuator and an outer circumference of the first wheel, and configured to transmit a rotational force of the fourth actuator to the first wheel.

6. The movable object according to claim 5, wherein the drive part further includes a second pulley surrounding the outer circumference of the first wheel and an outer circumference of the second wheel, and configured to transmit a rotational force of the first wheel to the second wheel.

7. The movable object according to claim 1, wherein the drive part includes first to fourth drive parts, and the first to fourth drive parts are provided on peripheral areas of a bottom surface of the upper frame.

8. The movable object according to claim 5, wherein a radius of curvature of the first pulley in an area where the first pulley surrounds the rotating shaft of the fourth actuator is less than a radius of curvature of the first pulley in an area where the first pulley surrounds the outer circumference of the first wheel.

9. The movable object according to claim 6, wherein a radius of curvature of the second pulley in an area where the second pulley surrounds the outer circumference of the first wheel corresponds to a radius of curvature of the second pulley in an area where the second pulley surrounds the outer circumference of the second wheel.

10. The movable object according to claim 7, wherein the first to fourth drive parts have substantially a same structure to be compatible with each other.

11. The movable object according to claim 1, further comprising an extension part provided on a top surface of the upper frame, and rotatable in a state of being fixed to the upper frame.

12. The movable object according to claim 5, wherein the first pulley faces an outer surface of the second link.

13. The movable object according to claim 6, wherein the second pulley faces an outer surface of the third link.

14. The movable object according to claim 13, wherein the second pulley is interposed between the third link and the first wheel.

15. A movable object, comprising:
an upper frame; and
a drive part disposed under the upper frame and connected to the upper frame,
wherein the drive part includes:
  a first actuator connected to the upper frame and rotating on a vertical axis;
  a first link connected to the first actuator and rotatable on the vertical axis by the first actuator;
  a second actuator provided on a first side of the first link and rotating on a horizontal axis; and
  a second link facing the first link and being rotatable on a first end portion thereof facing the first link by the second actuator,
wherein the first link is rotatable at 360 degrees by the first actuator.

16. A movable object, comprising:
an upper frame; and
a drive part disposed under the upper frame and connected to the upper frame,
wherein the drive part includes:
  a first actuator connected to the upper frame and rotating on a vertical axis;
  a first link connected to the first actuator and rotatable on the vertical axis by the first actuator;
  a second actuator provided on a first side of the first link and rotating on a horizontal axis;
  a second link facing the first link and being rotatable on a first end portion thereof facing the first link by the second actuator;
  a third actuator provided on a first side of the second link and rotating on the horizontal axis; and
  a third link facing the second link, and rotatable on a first end portion thereof facing the second link by the third actuator,
wherein the third link is rotatable on a first end portion thereof facing the second link at 360 degrees.

* * * * *